United States Patent
Salsich et al.

(10) Patent No.: US 9,878,395 B2
(45) Date of Patent: Jan. 30, 2018

(54) METHOD FOR DETECTING CURRENT TRANSFER IN A PLASMA ARC

(75) Inventors: Anthony V. Salsich, Appleton, WI (US); Alan A. Manthe, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2054 days.

(21) Appl. No.: 12/403,217

(22) Filed: Mar. 12, 2009

(65) Prior Publication Data

US 2009/0230098 A1 Sep. 17, 2009

Related U.S. Application Data

(60) Provisional application No. 61/036,530, filed on Mar. 14, 2008.

(51) Int. Cl.
*B23K 9/00* (2006.01)
*B23K 10/00* (2006.01)
*B23K 9/067* (2006.01)

(52) U.S. Cl.
CPC .............. *B23K 10/00* (2013.01); *B23K 9/067* (2013.01)

(58) Field of Classification Search
CPC ................................ B23K 10/00; B23K 9/067
USPC ............ 219/121.54, 121.84, 121.57, 121.59, 219/121.67, 121.39, 121.56, 121.44, 219/130.01, 131.1, 130.32, 130.4, 130.5
See application file for complete search history.

(56) References Cited

U.S. PATENT DOCUMENTS

| | | | |
|---|---|---|---|
| 4,280,042 A | | 7/1981 | Berger et al. |
| 4,996,407 A | * | 2/1991 | Traxler ................... 219/121.54 |
| 5,235,162 A | | 8/1993 | Nourbakhsh |
| 5,416,297 A | * | 5/1995 | Luo et al. ................ 219/121.57 |
| 5,530,220 A | | 6/1996 | Tatham |
| 5,620,617 A | * | 4/1997 | Borowy et al. .......... 219/121.54 |
| 5,660,745 A | * | 8/1997 | Naor ........................ 219/121.57 |
| 5,866,869 A | * | 2/1999 | Schneider et al. ....... 219/121.39 |
| 5,990,443 A | | 11/1999 | Tatham et al. |
| 6,194,682 B1 | * | 2/2001 | Schneider et al. ....... 219/121.55 |
| RE37,608 E | | 3/2002 | Solley et al. |
| 6,365,868 B1 | * | 4/2002 | Borowy et al. .......... 219/121.54 |
| 6,369,350 B1 | | 4/2002 | Norris |
| 2001/0042736 A1 | * | 11/2001 | Schneider et al. ....... 219/121.55 |
| 2003/0164359 A1 | * | 9/2003 | Norris et al. ............ 219/121.57 |

(Continued)

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

Methods and systems for transferring a plasma arc from between an electrode and a tip to between an electrode and a workpiece and back as dictated by the conditions at the cutting arc are provided. The present disclosure allows for arc transfer detection without use of a current sensor at the workpiece or knowledge of a precise pilot circuit limit value through a novel plasma arc control circuit. In one embodiment, the plasma arc control circuit provides a programmable current source and a current sink configured to limit current in a pilot arc control circuit. The pilot arc circuit may be configured to signal its limiting status to a controller, which may switch the pilot arc control circuit in or out of the current path. Certain embodiments may include a pulse width modulation control in the pilot arc control circuit for controlling current flow through the pilot arc circuit.

20 Claims, 9 Drawing Sheets

(56) References Cited

U.S. PATENT DOCUMENTS

| | | | |
|---|---|---|---|
| 2004/0095788 A1* | 5/2004 | Manthe | 363/125 |
| 2007/0045241 A1* | 3/2007 | Schneider et al. | 219/121.36 |
| 2008/0083713 A1* | 4/2008 | Sanders | 219/121.57 |
| 2008/0116186 A1* | 5/2008 | Luck et al. | 219/132 |

* cited by examiner

METHOD FOR DETECTING CURRENT TRANSFER IN A PLASMA ARC

CROSS REFERENCE TO RELATED APPLICATIONS

This application is a Non-Provisional Application of U.S. Provisional Patent Application No. 61/036,530, entitled "Method for Detecting Current Transfer in a Plasma Arc", filed Mar. 14, 2008, which is herein incorporated by reference.

BACKGROUND

The invention relates generally to metal cutting systems, and more particularly, to systems and methods for forming a first plasma arc between an electrode and a tip of a plasma cutter then transferring that arc such that it forms a second plasma arc between the electrode and the work lead.

A plasma cutting system harnesses the energy in plasma (e.g., high temperature ionized gas) to cut metal or other electrically conductive material. Prior to cutting, the first plasma arc, the pilot arc, is struck between the negatively charged electrode and the tip of the plasma cutter. The arc must then be transferred to the work piece to initiate cutting. The tip to work potential determines the favorability of the plasma shift from the tip to the workpiece and thus the transfer height (i.e., the height at which the pilot arc will transfer and become the cutting arc) of the system. Since a large transfer height is desirable, multiple methods, such as the placement of resistors in series with the pilot switch, are currently employed to increase the tip to work potential. However, these methods fail to maximize transfer height and often lead to lossy circuits.

After a pilot arc has been established, it is necessary to detect that current will readily flow to the work piece so that cutting current can be applied and the pilot circuit can be disabled. Since the arc transfer is a critical step in the initiation of plasma cutting, this requires a precise and accurate measurement technique. Traditionally, a work current sensor, such as a Hall-based current sensor, is connected to the work lead to measure the current in the work lead prior to transfer. However, it is now recognized that these sensors are costly and comprise a large portion of the overall machine cost. Accordingly, it is now recognized that there exists a need for plasma cutting systems equipped to maximize transfer heights and tip to work potential while minimizing cost.

BRIEF DESCRIPTION

The present disclosure is directed to systems and methods relating to a plasma arc control circuit. One embodiment of the present disclosure relates to arc transfer detection without use of a current sensor in the work lead or knowledge of a precise pilot circuit limit value. In particular, the present disclosure provides methods and systems for transferring a plasma arc from between an electrode and a tip to between an electrode and a workpiece and back as dictated by the conditions at the cutting arc. In one embodiment, the plasma arc control circuit provides a programmable current source and a current sink configured to limit current in a pilot arc control circuit. The pilot arc circuit may be configured to signal its limiting status to a controller, which may switch the pilot arc control circuit in or out of the current path. Certain embodiments may include a pulse width modulation control in the pilot arc control circuit for controlling current flow through the pilot arc circuit.

DRAWINGS

These and other features, aspects, and advantages of the present invention will become better understood when the following detailed description is read with reference to the accompanying drawings in which like characters represent like parts throughout the drawings, wherein.

Figure 9:
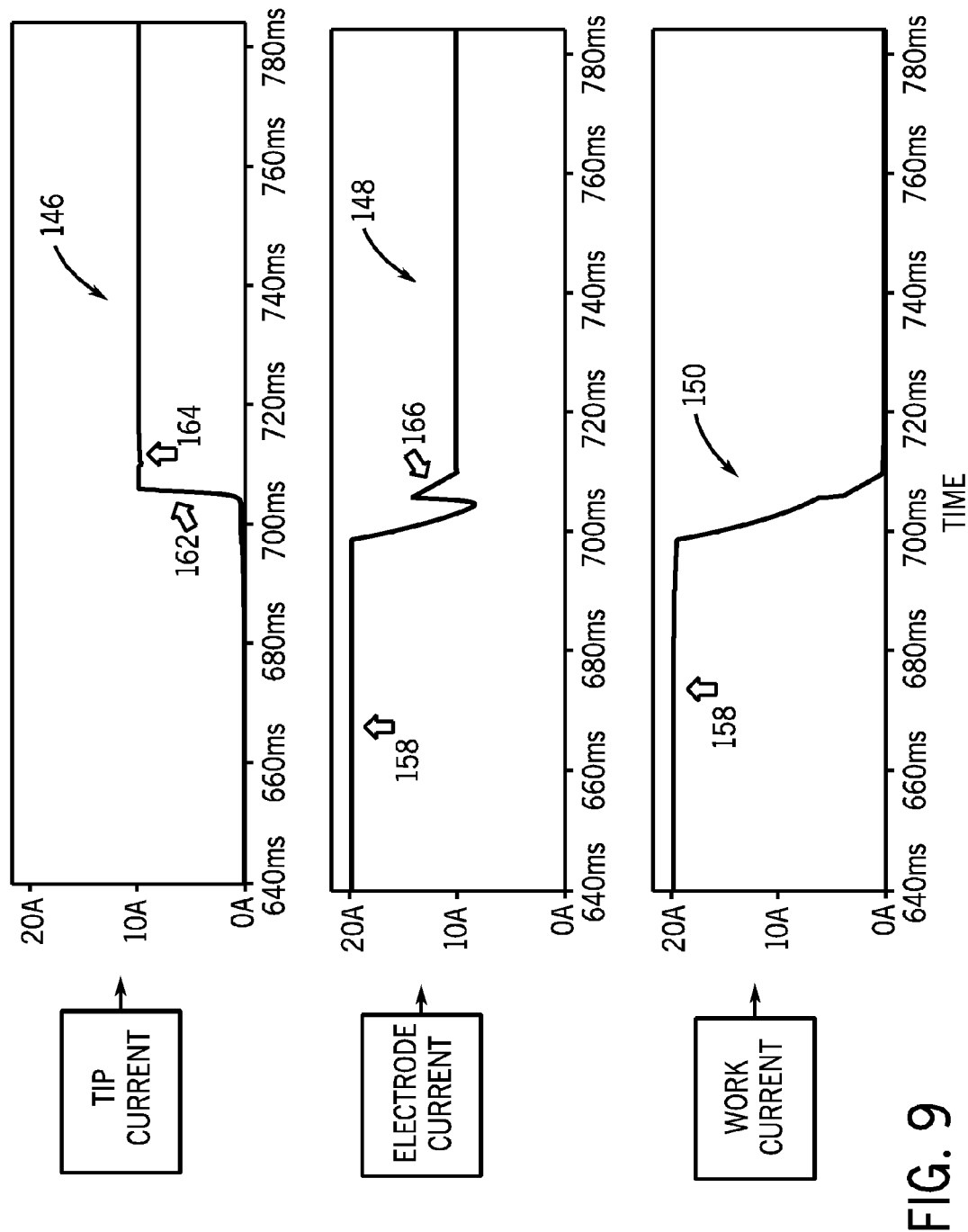
Figure 10:
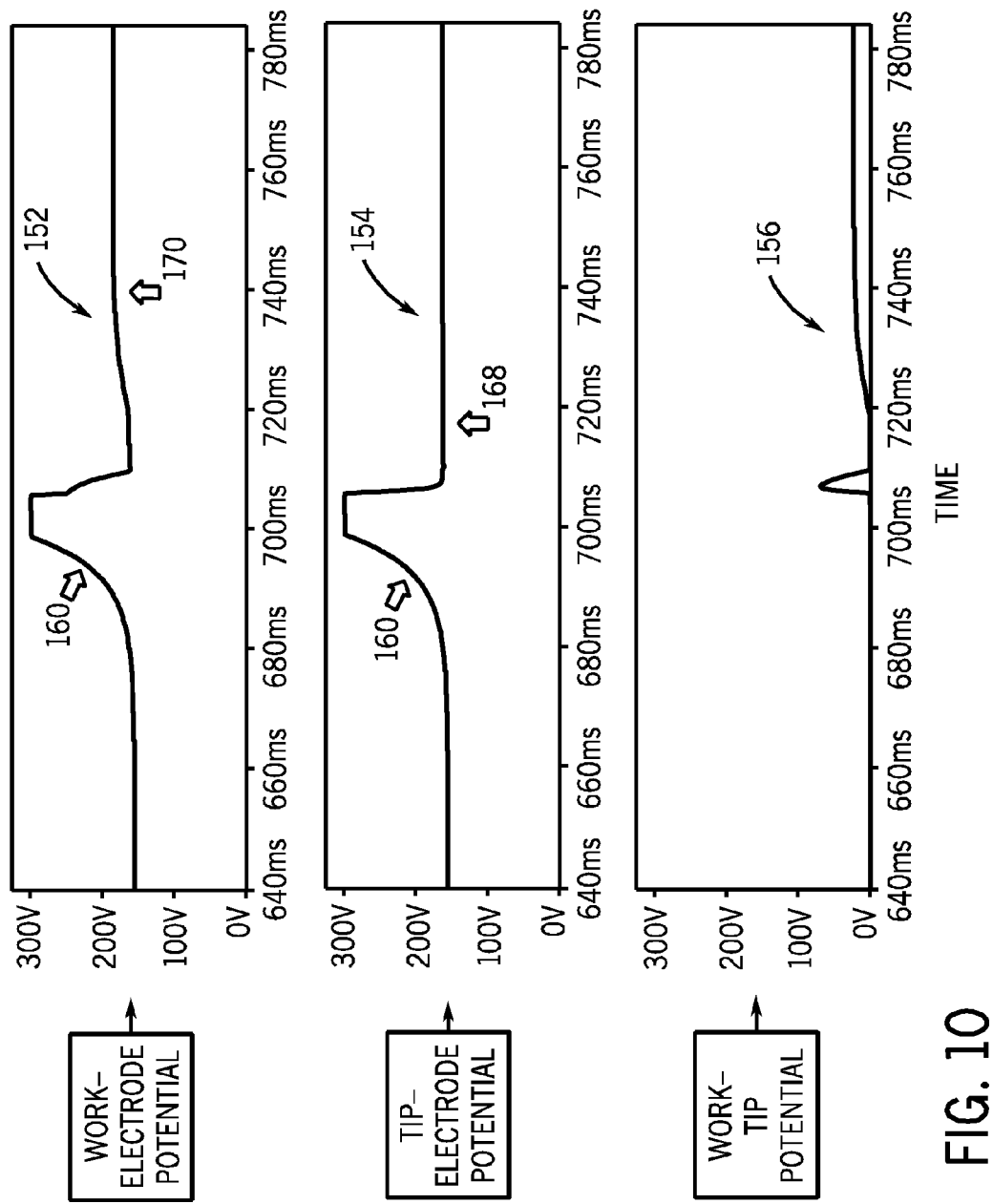

FIG. 9 is a graphical representation of exemplary current waveforms through the tip, the electrode, and the work piece during transfer back to the pilot arc from the cutting arc in accordance with aspects of the present disclosure; and FIG. 10 is a graphical representation of exemplary voltage potential waveforms during transfer back to the pilot arc from the cutting arc in accordance with aspects of the present disclosure;

DETAILED DESCRIPTION

Figure 1:
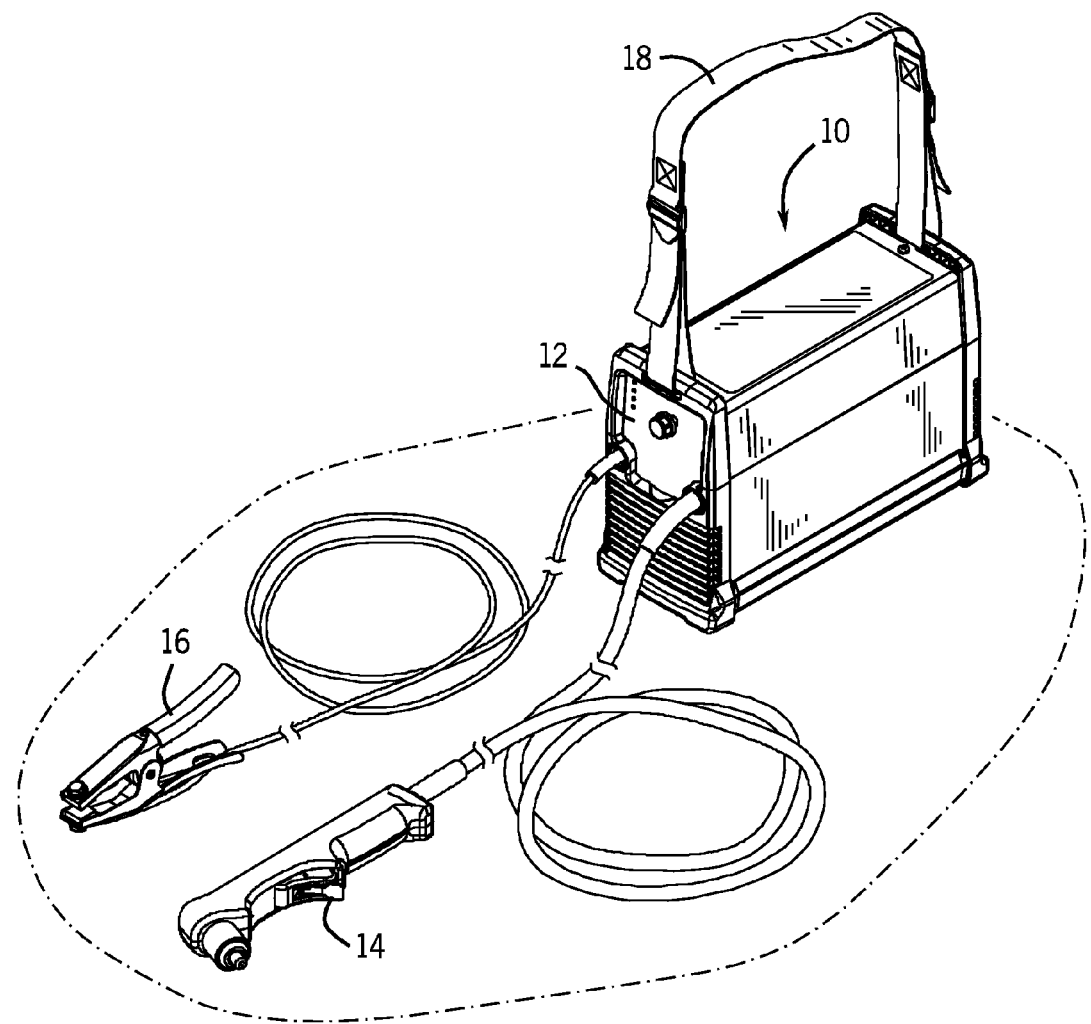
FIG. 1 is a perspective view of an exemplary plasma cutting power supply unit in accordance with aspects of the present disclosure.

FIG. 1 illustrates an exemplary plasma cutting power supply 10, which powers, controls, and provides consumables to a cutting operation in accordance with aspects of the present disclosure. A torch 14 and a work lead clamp 16 are communicatively coupled to the power supply unit 10 and may be utilized to perform cutting operations. The front side of the power supply unit 10 in the illustrated embodiment contains a control panel 12, through which a user may control the supply of materials, such as power, gas flow, and so forth, to the cutting torch 14. The work lead clamp 16 typically connects to a workpiece to close the circuit between the torch 14, the work piece, and the supply unit 10, and to ensure proper current flow. The portability of the unit 10 depends on a handle 18, which enables the user to move the power supply unit 10 to the location of the workpiece.

Figure 2:
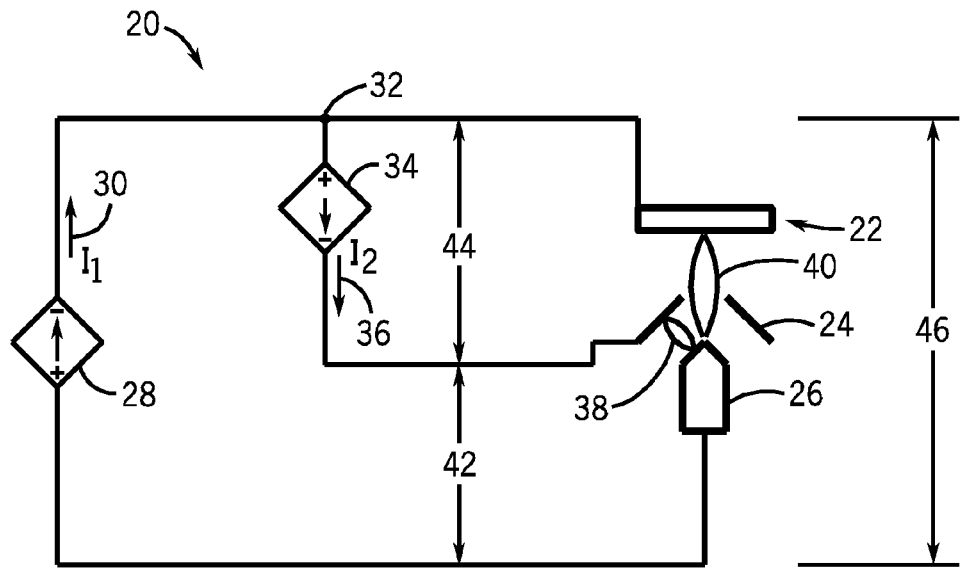
FIG. 2 is a circuit diagram illustrating an exemplary embodiment of the power supply circuitry in accordance with aspects of the present disclosure.

Internal components of the power supply unit 10 receive power from a wall outlet, a generator, a battery, or the like and then supply power to circuitry that enables the formation of plasma arcs necessary for the plasma cutting operation. FIG. 2 illustrates an arc control circuit 20 that controls the formation of the plasma arcs between a workpiece 22, a torch tip 24, and an electrode 26 by controlling current flow through circuit components. A first current path through a pilot arc circuit may be established when a programmable current source 28 outputs a first current 30 that flows through a node 32 into a current regulator 34, which is capable of programmable switching. The current regulator 34 outputs a second current 36 (e.g., pulse width modulated current). In one embodiment, the pulse width modulation of the second current 36 is hysteretic, wherein hysteretic means maintaining current between a lower limit and an upper limit. The second current 36 flows through the tip 24 and the electrode 26, establishing a pilot arc 38 between the tip 24 and the electrode 26. The second current 36 then returns to the current source 28, completing the first current path through the components that define the pilot arc circuit. A second current path through a cutting arc circuit may be established when the programmable current source 28 outputs the first current 30 that flows through a node 32 into the workpiece 22 and the electrode 26, establishing a cutting arc 40 between the workpiece 22 and the electrode 26. The first current 30 then returns to the current source 28, completing the second current path through the components that define the cutting arc circuit. The amount and path of the current flow through the components of the arc control circuit 20 define a voltage potential 42 between the electrode 26 and the tip 24, a voltage potential 44 between the tip 24 and the workpiece 22, and a voltage potential 46 between the electrode and the workpiece 46.

In one embodiment, the arc control circuit 20 achieves a current limit through the pilot arc circuit by employing a chopper switch in the current regulator 34. In one embodiment, the current source 28 is configured to programmably provide a range of output currents limited only by its rated output voltage. The current regulator 34 may comprise a fixed current limiter and may be switched in or out of the active circuit to achieve the current limit through the pilot arc circuit. The chopper switch in the current regulator 34 may be kept in an ON state as long as the pilot current is less than a preset level, where the ON state may be defined by a closed switch position that allows current flow through the pilot arc circuit, establishing the pilot arc 38. If the current exceeds the preset level, the chopper switch toggles to an OFF state, where the OFF state is defined by an open switch position that prohibits additional current flow through the pilot arc circuit. When the switch is in an OFF state, the current decays to a lower limit at which point the switch closes to an ON state to maintain the pilot arc 38. In this way, the current regulator 34 switches ON and OFF to control the current through the pilot arc circuit and maintain the pilot arc 38.

After a current flow and a pilot arc 38 have been established in the pilot arc circuit, the setpoint of the current source 28 can be incrementally increased until the chopper switch in the current regulator 34 starts to switch ON and OFF to maintain a preset level of current in the pilot arc circuit by limiting the amount of current allowed to flow from the current source 28 through the pilot arc circuit. In one embodiment, when the current source 28 receives feedback indicating that limiting is occurring, no substantial transfer of the pilot arc 38 to the workpiece 22 is occurring. However, when the chopper switch in the current regulator 34 stays ON as the current 30 from the current source 28 is increased, this indicates that transfer of the pilot arc 38 to the workpiece 22 is occurring since the current 30 from the source 28 is configured to flow either to the workpiece 22 or to the current regulator 34 when exiting the node 32. The current regulator 34 may be left in the current path while the current output 30 is increased to a preset level without the pilot arc circuit going into limit. At this point, the cutting arc 40 is established between the electrode 26 and the workpiece 22, the current regulator 34 may be removed from the current path, and cutting may occur. During the plasma cutting operation, if imminent cutting arc 40 outage is detected, the current regulator 34 may be placed back in the current path, re-enabling current flow through the pilot arc circuit and reestablishing the pilot arc 38.

The combined use of the pilot arc circuit with the cutting arc circuit in accordance with aspects of the present disclosure offers distinct benefits. For instance, there is no need for a current sensor at the workpiece 22 for detection of arc transfer to the workpiece 22. The exact preset current limit in the current regulator 34 need not be known. Instead, when no arc transfer from the pilot arc 38 to the cutting arc 40 occurs, the programmable current output 30 from the current source 28 may be manipulated to find a threshold for the limit value of the current regulator 34. Additionally, any time the current regulator 34 is in limit, an improved voltage potential 44 is established between the tip 24 and the workpiece 22, leading to an advantageous transfer height.

Figure 3:
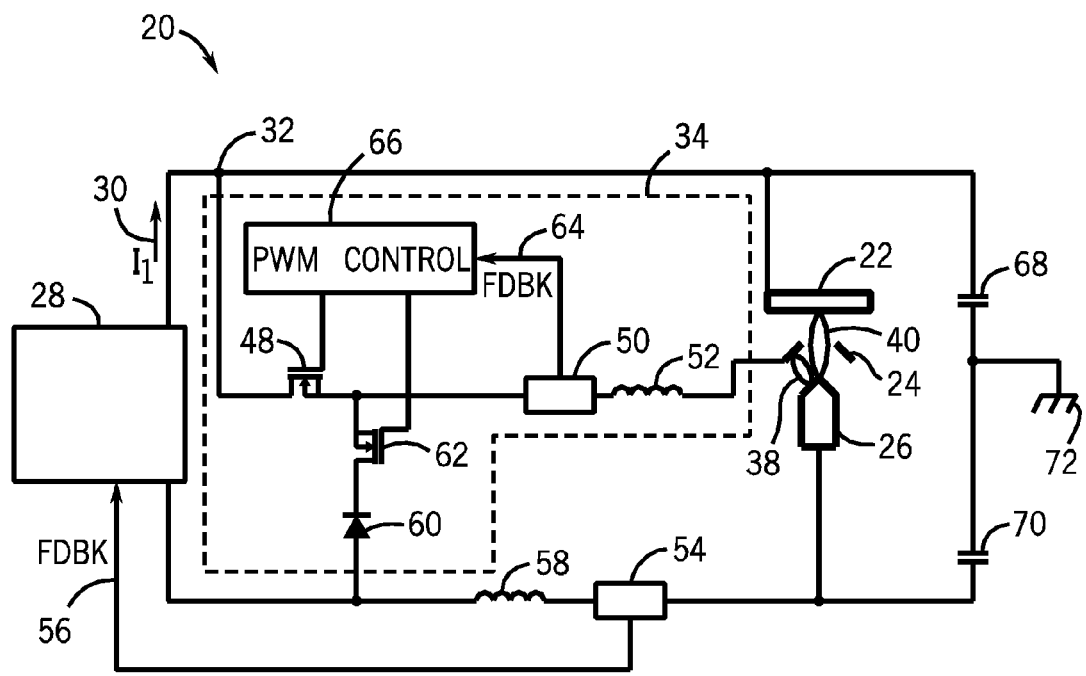
FIG. 3 is a circuit diagram illustrating one embodiment of the power supply circuitry in accordance with aspects of the present disclosure.

FIG. 3 illustrates one embodiment of the arc control circuit shown in FIG. 2. In this embodiment, a first current path through the pilot arc circuit may be established when the programmable current source 28 outputs the first current 30 that flows through the node 32, a first transistor switch 48, a first current sensor 50, a first inductor 52, the tip 24, and the electrode 26, forming the pilot arc 38 between the tip 24 and the electrode 26 with the resulting second current 36 (i.e., pulse width modulated current). The current 36 then passes through a second current sensor 54, which provides a feedback signal 56 to the current source 28. The current continues through a second inductor 58 to return to the current source 28, thus completing the first current path through the pilot arc circuit. The pilot arc circuit also contains a diode 60 and a second transistor switch 62, which breaks the path through the diode 60. The diode 60 and the first transistor switch 48 combine with the first inductor 52 to form and function as a buck converter. The intrinsic property of the first inductor 52 that attempts to keep current flow constant is exploited. A current feedback signal 64 from the first current sensor 50 communicates with a pulse width modulation control 66, which switches the first transistor 48 ON and OFF to maintain the pilot arc 38. When the first transistor 48 is ON (i.e. in a closed position), the first inductor 52 resists increases in current flow and energy builds in the first inductor 52. When the first transistor switch is OFF (i.e. in an open position), the current through the pilot arc circuit is forced by the first inductor 52 to freewheel through the tip 24, the electrode 26, and the second inductor 58, up through the diode 60 and the second transistor 62, and back through the first inductor 52. In this way, the buck converter (i.e. the first transistor 48, the diode 60, first inductor 52, and the second inductor 58) controls the current flow in the tip 24, preventing current overshoots and subsequent tip 24 damage. As previously described with respect to FIG. 2, a second current path through a cutting arc circuit may be established when the programmable current source 28 outputs a first current 30 that flows through a node 32 into the workpiece 22 and the electrode 26, establishing a cutting arc 40 between the workpiece 22 and the electrode 26. The first current 30 then returns to the current source 28 through a second current sensor 54 and a second inductor 58, completing the second current path through the components that define the cutting arc circuit. A first capacitor 68, a second capacitor 70, and a ground 72 minimize circuit noise. Additionally, the first capacitor 68 and the second capacitor 70 may provide a high speed path for current flow when the first transistor 48 is switching.

Figure 4:
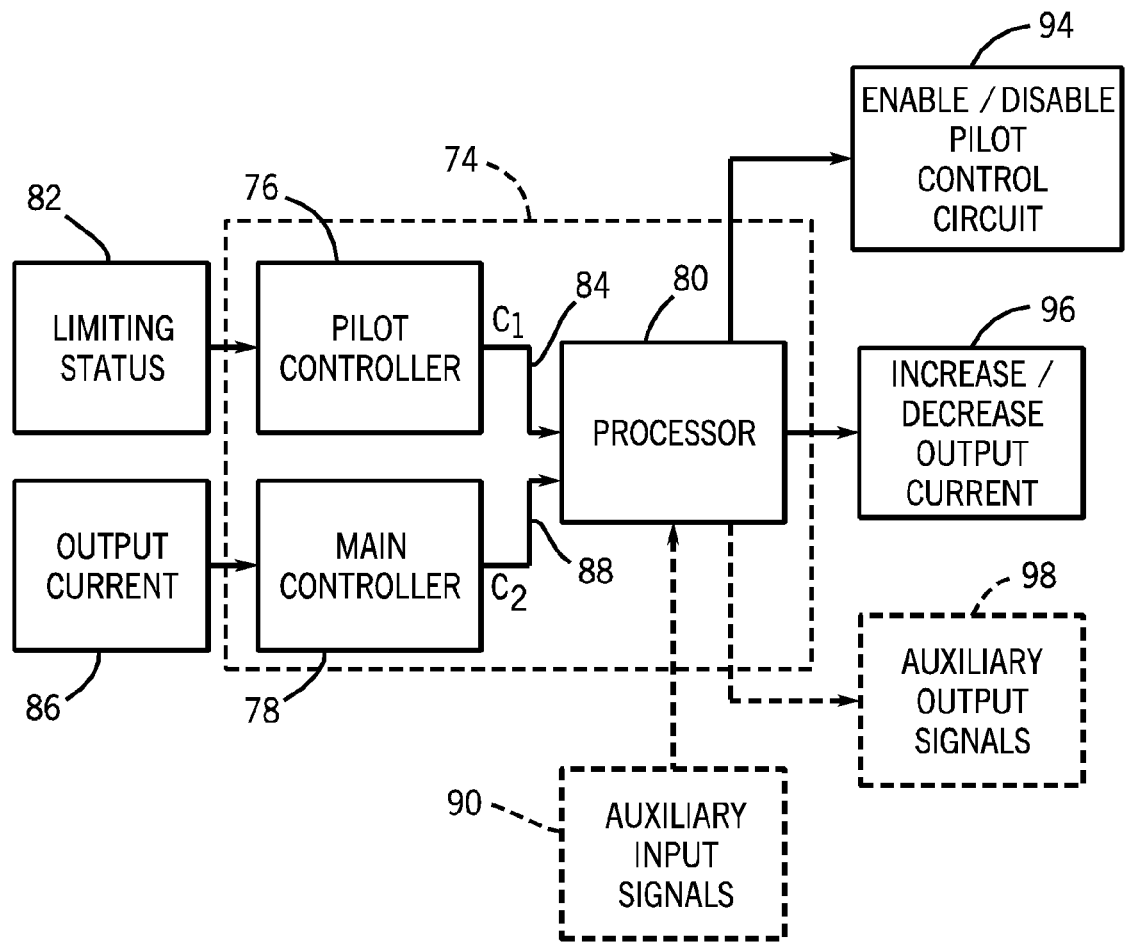
FIG. 4 is a block diagram illustrating exemplary processing logic that may be used to control the current source output and the pilot control circuitry in accordance with aspects of the present disclosure.

FIG. 4 is a block diagram illustrating exemplary processing logic that may be used to control the functioning of the arc control circuit 20 by controlling the current source output 30 and the pilot control circuitry. In the illustrated embodiment, a controller 74 comprises a pilot controller 76, a main controller 78, and a processor 80, which receive feedback signals from and deliver commands to the plasma cutting operation. The pilot controller 76 and the main controller 78 may comprise software, memory, circuitry, and so forth. The pilot controller 76 may receive signals regarding the functioning of the pilot arc circuit, such as a limiting status 82 of the current regulator 34, and output a control signal 84 based on its inputs. Similarly, the main controller 78 may receive signals regarding the current source 28, such as a level of the current output 86, and output a control signal 88 based on its inputs. The processor 80 receives the control signals 84, 88 from the pilot controller 76 and the main controller 78 and integrates the information with any additional auxiliary input signals 90. The processor then generates output control signals that drive the operation of the arc control circuit 20. The pilot arc circuit is controlled by a signal 94 from the processor 80 that enables or disables the pilot control circuit. A signal 96 from the processor 80 drives the increase or decrease of output current from the current source 28. Additionally, the processor may output one or more auxiliary signals 98 that drive peripheral functions related to the plasma cutting operation.

Figure 5:
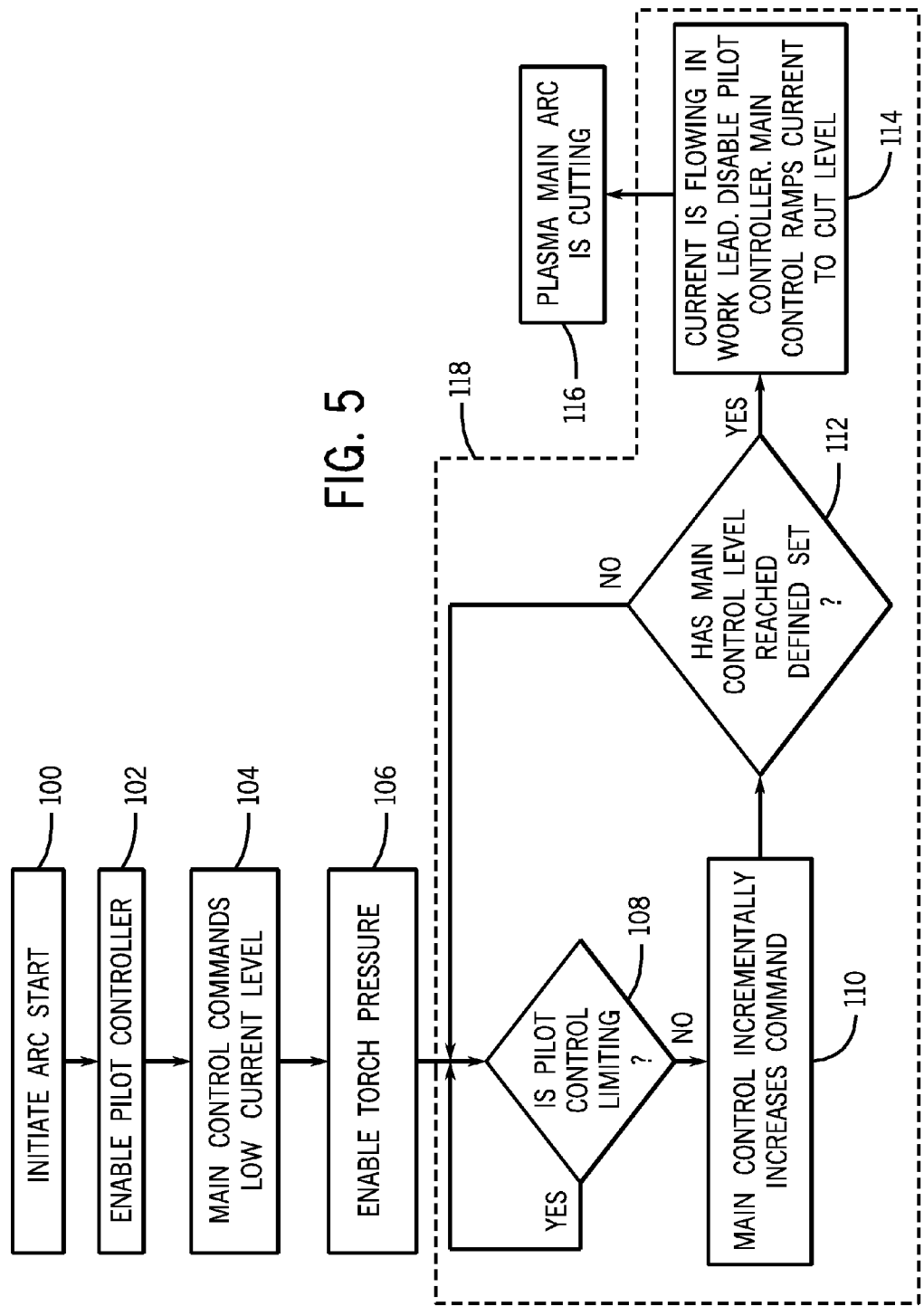
FIG. 5 is a block diagram illustrating exemplary logic that may be used to establish the pilot arc and the cutting arc in accordance with aspects of the present disclosure.

FIG. 5 is a block diagram illustrating exemplary logic behind one embodiment of the present disclosure that may be used to establish the pilot arc 38 and the cutting arc 40. Each block in FIG. 5 may represent a function or step. First, in the illustrated embodiment, the controller 74 initiates the arc start, as represented by block 100, and enables the pilot control circuitry, as represented by block 102. Initially, the main controller 78 outputs a signal 88 that commands a low output current level, as represented by block 104. The processor then outputs an auxiliary control signal 98 to enable torch pressure, as represented by block 106. Feedback regarding whether or not the pilot control is limiting is then sought from the arc control circuit 20, as represented by block 108. If the pilot control is limiting, the controller 74 maintains a constant output current level. If the pilot control is not limiting, the main controller 78 outputs a control signal 88 that incrementally increases the current output of the current source 28, as represented by block 110. Feedback regarding whether the main controller 78 has reached a defined current setpoint is then sought, as represented by block 112. If the main controller 78 has not reached the defined setpoint, feedback is once again sought regarding whether or not the pilot control is limiting, as represented by block 108. If the main controller 78 has reached the defined setpoint, current is flowing through the work piece 22, the pilot controller 76 is disabled, and the main control ramps up the current output to a level sufficient for the plasma cutting operation, as represented by block 114. At this point, as represented by block 116, the cutting arc 40 is cutting. The described pilot-to-work transfer, as represented by block 118, illustrates the logic behind the circuit illustrated in FIG. 2.

Figure 6:
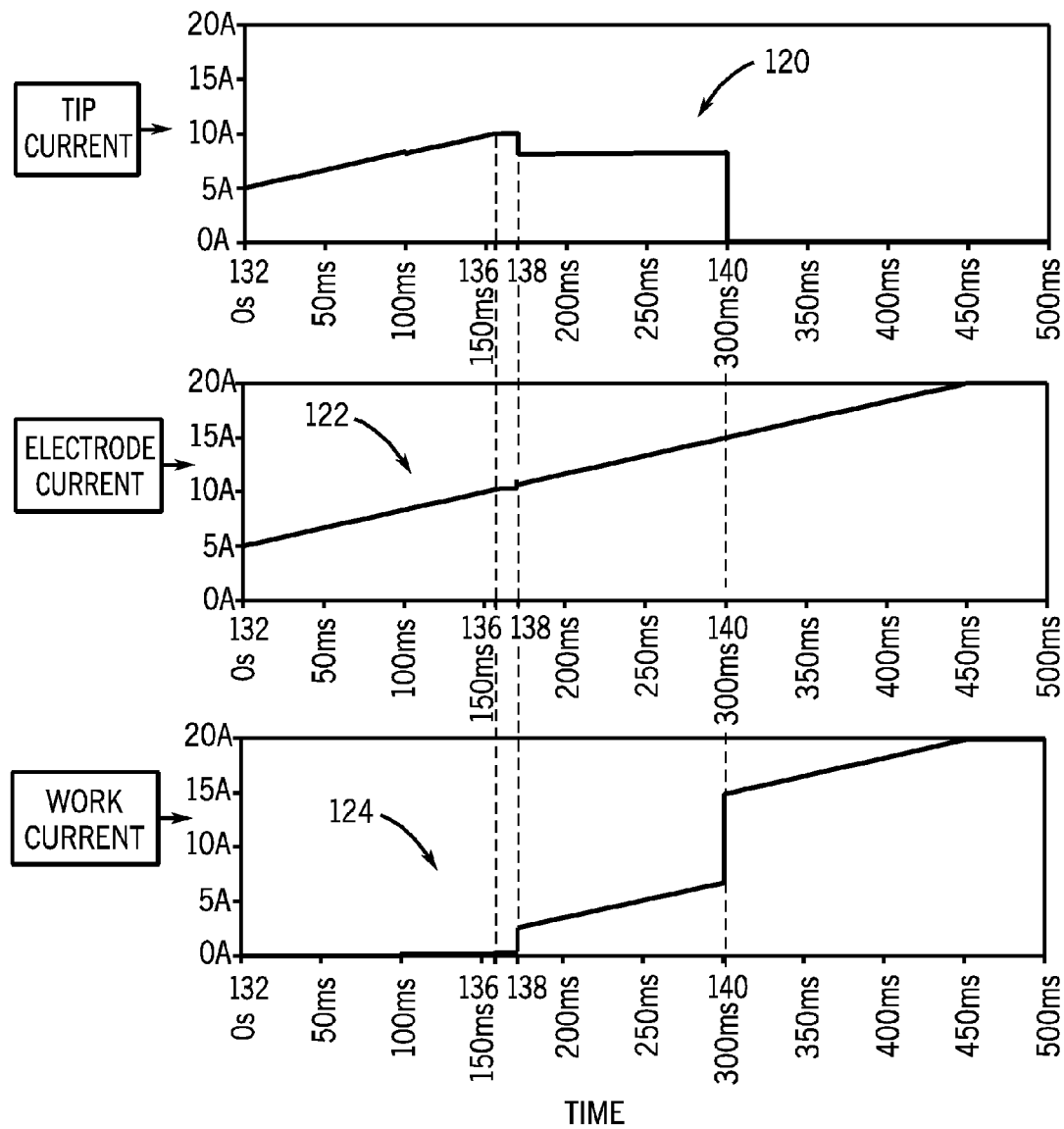
FIG. 6 is a graphical representation of exemplary current waveforms through the tip, the electrode, and the work piece during cutting arc initiation in accordance with aspects of the present disclosure.
Figure 7:
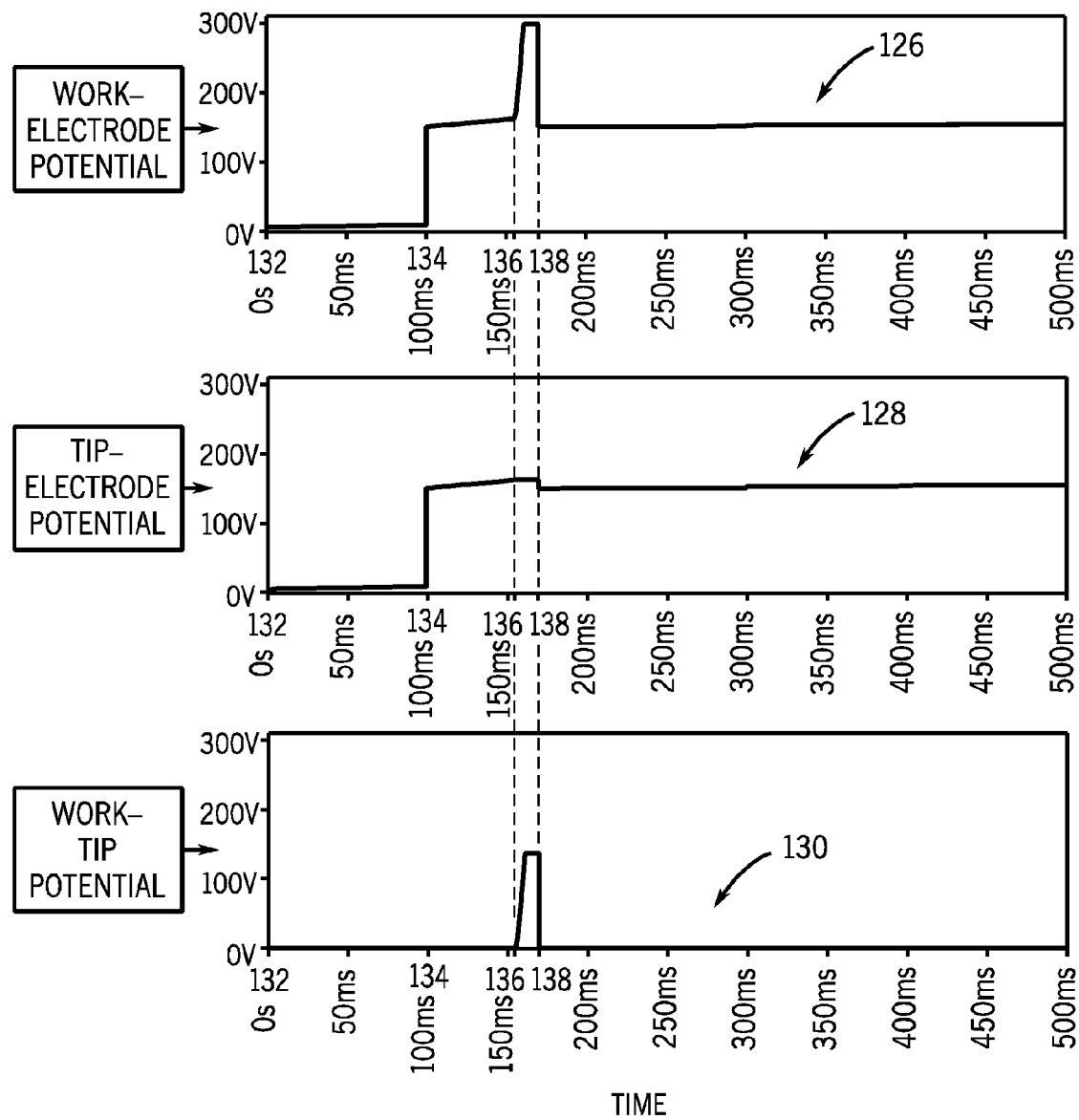
FIG. 7 is a graphical representation of exemplary voltage potential waveforms during cutting arc initiation in accordance with aspects of the present disclosure.

FIGS. 6 and 7 illustrate exemplary current and voltage potential waveforms, respectively, from when the pilot arc 38 is initially struck until arc transfer from between the electrode 26 and the tip 24 to between the electrode 26 and the workpiece 22. FIG. 6 illustrates a tip current waveform 120, an electrode current waveform 122, and a work current waveform 124. FIG. 7 illustrates a work-electrode potential waveform 126, a tip-electrode potential waveform 128, and a work-tip potential waveform 130. The arc control circuit 20 begins operation at an initial start time 132, beginning current flow through the tip 24 and the electrode 26. At a later time 134, air flow through the welding system begins, giving rise to a work-electrode potential and a tip-electrode potential. Subsequently, at a time 136, the pilot circuit goes into limit, leveling out current flow through the tip 24 and giving rise to an increase in the work-electrode potential and an initiation of a tip-work potential. At a later time 138, tip current decreases while work current increases due to a diversion of current from the tip 24 to the workpiece 22. At this time 138, the work-electrode potential decreases to a new steady state value, and the tip-work potential falls back to zero. Subsequently, at a time 140, the pilot circuit is disengaged by the controller 74, triggering a falloff of tip current down to zero and a corresponding increase in work current.

Figure 8:
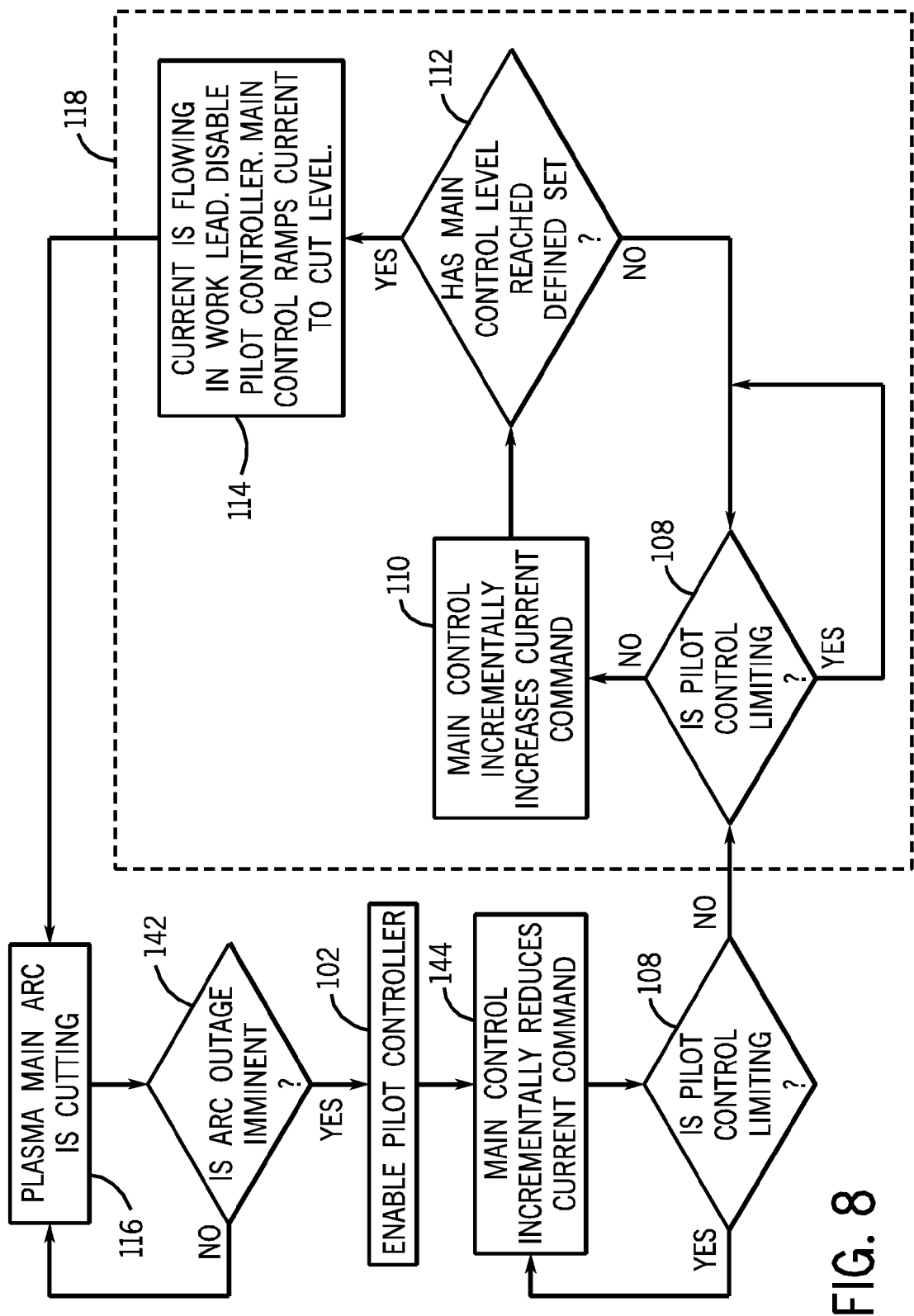
FIG. 8 is a block diagram illustrating exemplary logic that may be used to transfer the cutting arc back to the pilot arc in accordance with aspects of the present disclosure.

FIG. 8 is a block diagram illustrating exemplary logic behind one embodiment of the present disclosure that may be used to transfer the cutting arc 40 back from between the workpiece 22 and the electrode 26 to between the tip 24 and the electrode 26 during instances when an imminent arc outage may be detected. In this diagram, the logic 118 behind the pilot-to-work arc transfer remains the same with respect to FIG. 5. However, once the cutting arc is cutting, as represented by block 116, a feedback signal regarding whether or not arc outage is imminent is sought, as represented by block 142. If arc outage is not imminent, cutting continues, as represented by block 116. If arc outage is imminent, the pilot controller is enabled, as represented by block 102, to reestablish the pilot control circuitry as part of the current path. The main controller 78 outputs a control signal 88 to incrementally reduce the output current, as represented by block 144. A feedback signal is then sought from the arc control circuit 20 regarding whether or not the pilot control is limiting, as represented by block 108. If the pilot control is limiting, the main controller 78 outputs a control signal 88 to incrementally reduce the output current, as represented by block 144. If the pilot control is not limiting, the pilot to work transfer logic represented by block 118 is employed to once again transfer the pilot arc 38 from between the electrode 26 and the tip 24 to between the electrode 26 and the workpiece 22.

FIGS. 9 and 10 illustrate exemplary current and voltage potential waveforms, respectively, from when the cutting arc 40 is cutting to when cutting arc outage is imminent to when the pilot arc 38 is reestablished. FIG. 9 illustrates a tip current waveform 146, an electrode current waveform 148, and a work current waveform 150. FIG. 10 illustrates a work-electrode potential waveform 152, a tip-electrode potential waveform 154, and a work-tip potential waveform 156. Initially, the cutting current is established and flowing through the electrode and the workpiece and a work-electrode and a tip-electrode potential exist as indicated by arrow 158. However, when an arc outage becomes imminent, as indicated by an increase in the work-electrode and the tip-electrode potentials designated by arrow 160, the pilot circuit is reengaged, as indicated by arrow 162, to prevent loss of the plasma arc. When the pilot circuit is reengaged, as indicated by arrow 162, the tip current increases until the pilot circuit goes into limit and the tip current becomes limited, as indicated by arrow 164. Additionally, when the pilot circuit goes into limit, the work-electrode potential and the tip-electrode potential decrease from a peak while the main output ramps down, as indicated by arrow 166 and the electrode current spikes downward. For a short time duration, the output current briefly undershoots the tip limit, as indicated by arrow 168. When the pilot circuit is back in limit, the work-electrode and the tip-electrode potential fall back to a steady state value.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A plasma cutting system, comprising:
    a current source that in operation provides a programmable current output;
    a current regulator comprising a switch and being configured to receive the programmable current output from the current source;
    a pilot arc circuit current path that in operation is established between the current source, the current regulator, an electrode, and a tip to establish a pilot arc between the electrode and the tip when the pilot arc circuit current path is active;
    a cutting arc circuit current path that in operation is established between the current source, a workpiece, and the electrode to establish a cutting arc between the workpiece and the electrode when the cutting arc circuit current path is active;
    a pilot control that in operation limits a current amplitude level through the pilot arc circuit current path from the current source to the tip by cycling the switch between an enable state and a disable state to maintain the pilot arc between the electrode and the tip; and
    a power control that in operation, once the pilot arc is established between the electrode and the workpiece, increases a set point of the programmable current output and, as the set point is increased, determines, without detecting current to the workpiece via a current sensor, when a transfer of the pilot arc to the workpiece to establish the cutting arc has occurred by detecting when the switch in the current regulator ceases cycling and remains in the enable state.

2. The plasma cutting system of claim 1, comprising a buck converter located along the pilot arc circuit current path and configured to limit the current amplitude level at the tip.

3. The plasma cutting system of claim 1, comprising a sensor and an inductor aligned in series between the switch and the tip, wherein the sensor is configured to provide a current feedback to the pilot control.

4. The plasma cutting system of claim 3, wherein the pilot control comprises a hysteretic control circuit.

5. The plasma cutting system of claim 1, wherein the current source comprises an inverter.

6. The plasma cutting system of claim 1, comprising a sensor and an inductor aligned in series between the electrode and the current source, wherein the sensor is configured to provide a current feedback to the power control.

7. A method of transferring a plasma arc of a plasma cutter, comprising:
    establishing a pilot arc between an electrode and a tip through a pilot arc circuit current path between a current source, a current regulator comprising a switch, the electrode, and the tip;
    limiting a current amplitude level through the pilot arc circuit current path by toggling the switch between an enable state and a disable state to maintain the pilot arc between the electrode and the tip;
    increasing a set point of the current source; and
    detecting, as the set point of the current source is increased, when a transfer of the pilot arc to a workpiece to establish a cutting arc has occurred by detecting when the switch ceases cycling and remains in the enable state.

8. The method of claim 7, comprising setting the set point of the current source to a cutting current level when the transfer of the pilot arc to the cutting arc is detected.

9. The method of claim 7, comprising stabilizing current flow between the electrode and the current source with an inductor.

10. The method of claim 7, comprising limiting the current amplitude level using a hysteretic control circuit configured to toggle the switch based on a current feedback received from a sensor positioned between the switch and the tip.

11. The method of claim 7, comprising stopping current flow through the pilot arc circuit current path when a predetermined level of current flow between a work lead and the electrode is obtained.

12. The method of claim 11, comprising reinitiating current flow through the pilot arc circuit current path when an indication of cutting arc failure is identified.

13. The method of claim 7, wherein the current source is pulse width modulated.

14. A plasma cutting control system, comprising:
    a pilot arc control circuit that in operation controls a current regulating switch to cycle between an enable state and a disable state to establish a pilot arc between an electrode and a tip and to limit current flow through a pilot arc circuit comprising a current source, the current regulating switch, the electrode, and the tip; and
    a cutting arc control circuit that in operation, once the pilot arc is established, increases a set point of the current source and, as the set point of the current source is increased, determines, by detecting when the current regulating switch ceases cycling, when a transfer occurs from the pilot arc to a cutting arc between a workpiece and the electrode.

15. The plasma cutting system of claim 14, wherein the pilot arc control circuit comprises a hysteretic control circuit.

16. The plasma cutting system of claim 14, wherein, in operation, the cutting arc control circuit disables current flow through the pilot arc circuit when the transfer occurs from the pilot arc to the cutting arc.

17. The plasma cutting system of claim 14, wherein, in operation, the cutting arc control circuit sets the set point of the current source to a cutting arc level when the transfer of the pilot arc to the cutting arc is detected.

18. The plasma cutting system of claim 14, wherein the current source comprises an inverter.

19. The plasma cutting system of claim 14, wherein the pilot arc circuit comprises a buck converter.

20. The plasma cutting system of claim 16, wherein, in operation, the cutting arc control circuit reinitiates current flow through the pilot arc circuit when an indication of cutting arc failure is identified.

* * * * *